United States Patent [19]
Livesay et al.

[11] Patent Number: 5,197,273
[45] Date of Patent: Mar. 30, 1993

[54] FLUID CONTROL SYSTEM FOR A TRACK PRESS

[75] Inventors: Richard E. Livesay, Peoria, Ill.; Owen R. Thompson, Louisville, Ky.

[73] Assignee: Caterpillar Inc., Peoria, Ill.

[21] Appl. No.: 856,609

[22] Filed: Mar. 24, 1992

[51] Int. Cl.⁵ .............................................. B21L 9/06
[52] U.S. Cl. ........................................... 59/7; 59/11; 59/901
[58] Field of Search .................... 59/7, 8, 10, 11, 35.1, 59/901

[56] References Cited

U.S. PATENT DOCUMENTS

| | | | |
|---|---|---|---|
| 3,028,723 | 4/1962 | Kaplan et al. | 59/7 |
| 3,075,346 | 1/1963 | Quarve et al. | 59/7 |
| 3,075,347 | 1/1963 | Bonifas et al. | 59/7 |

FOREIGN PATENT DOCUMENTS 0560727  6/1977  U.S.S.R. .................................. 59/7

*Primary Examiner*—David Jones
*Attorney, Agent, or Firm*—Claude F. White

[57] ABSTRACT

A fluid control system for a track press has first and second main fluid work circuits and a plurality of auxiliary fluid work circuits. The first and second work circuits are substantially similar and each has a pair of dual acting slave cylinders and one single acting master cylinder. The cylinder rod of each master cylinder is connected to the cylinder rods of the respective slave cylinders through a reaction bar. Each of the first and second work circuits has a fluid reservoir and a high flow capacity control valve in direct communication with a respective fluid reservoir and a respective master cylinder. During fast forward and reverse of the slave cylinders, the piston and rod of each master cylinder is advanced or retracted due to the interconnection with the reaction bar. During fast forward, fluid is drawn from the reservoirs at a fast rate to rapidly fill the large slave cylinders. This provides extremely fast cycle times.

16 Claims, 10 Drawing Sheets

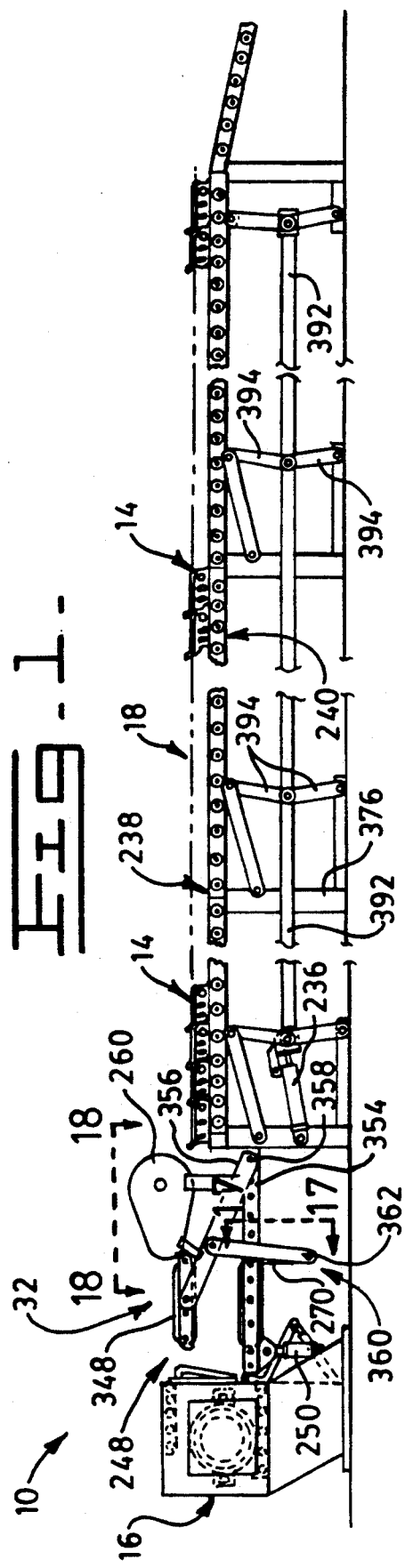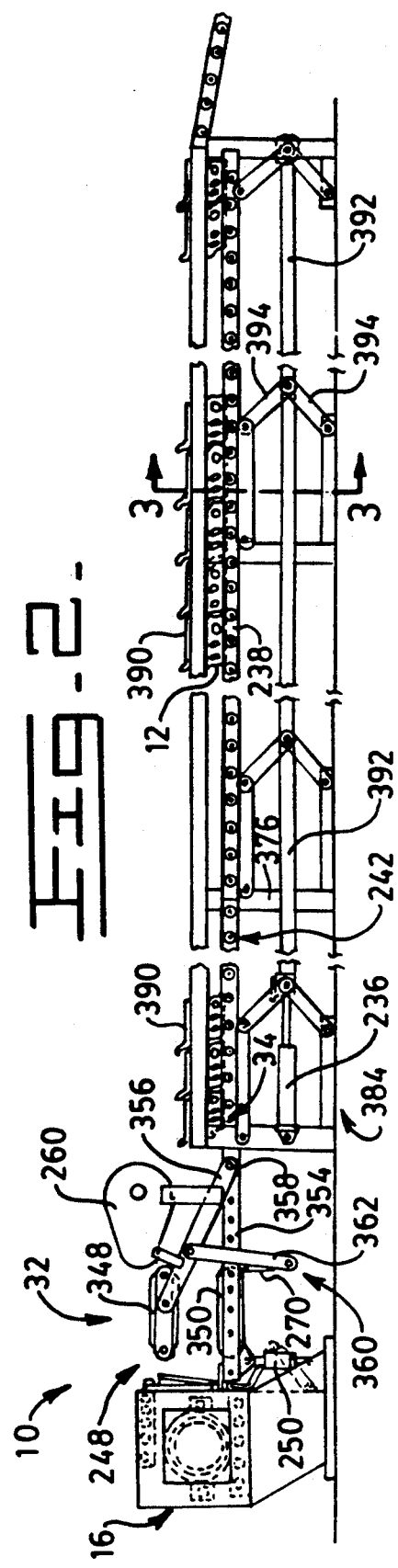

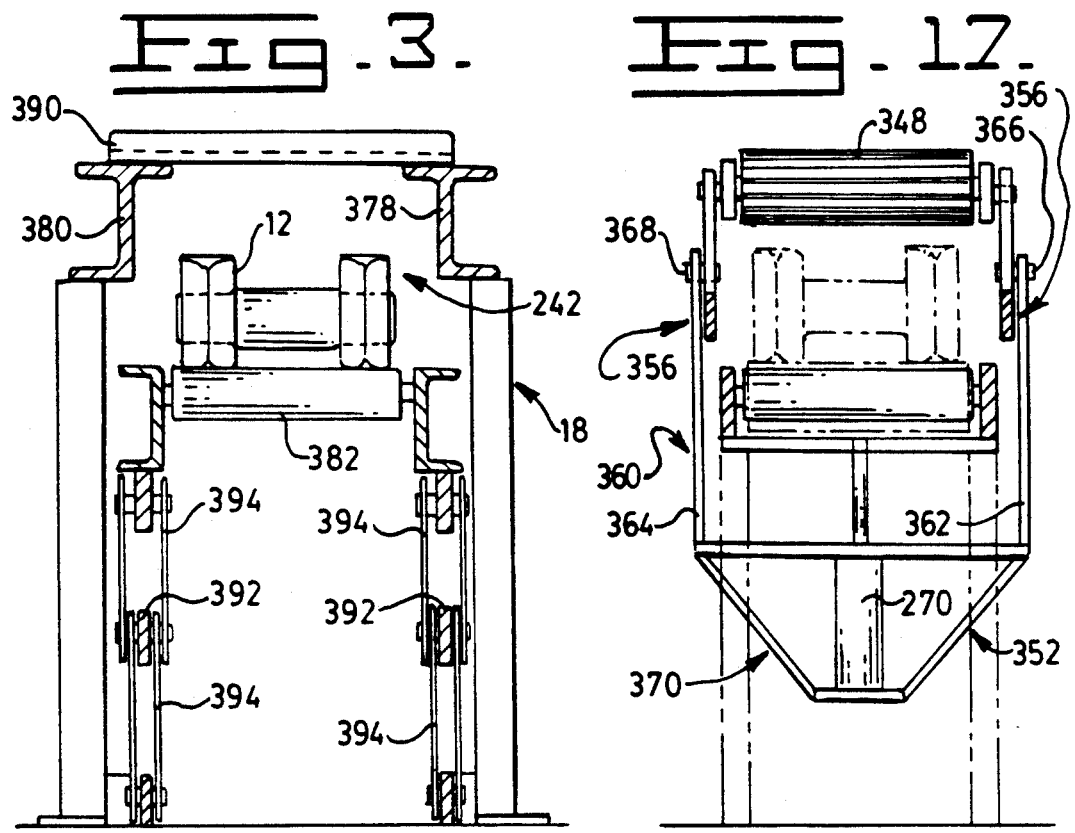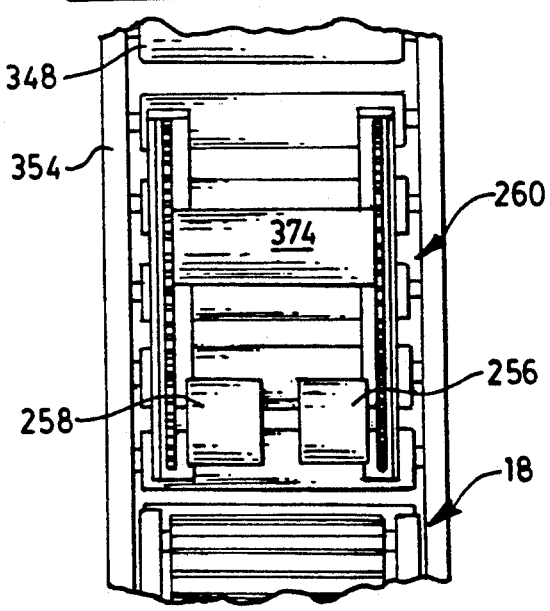

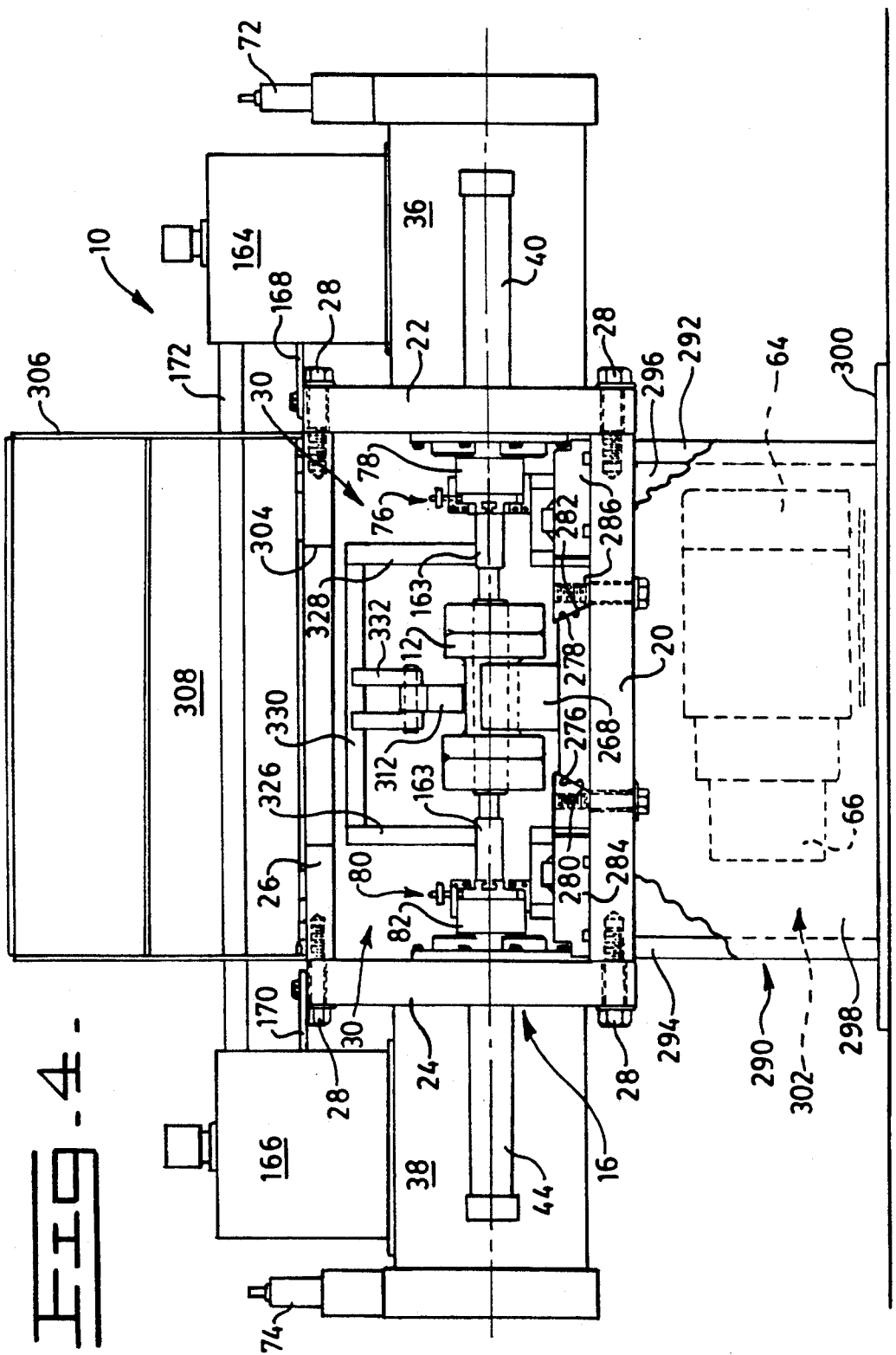

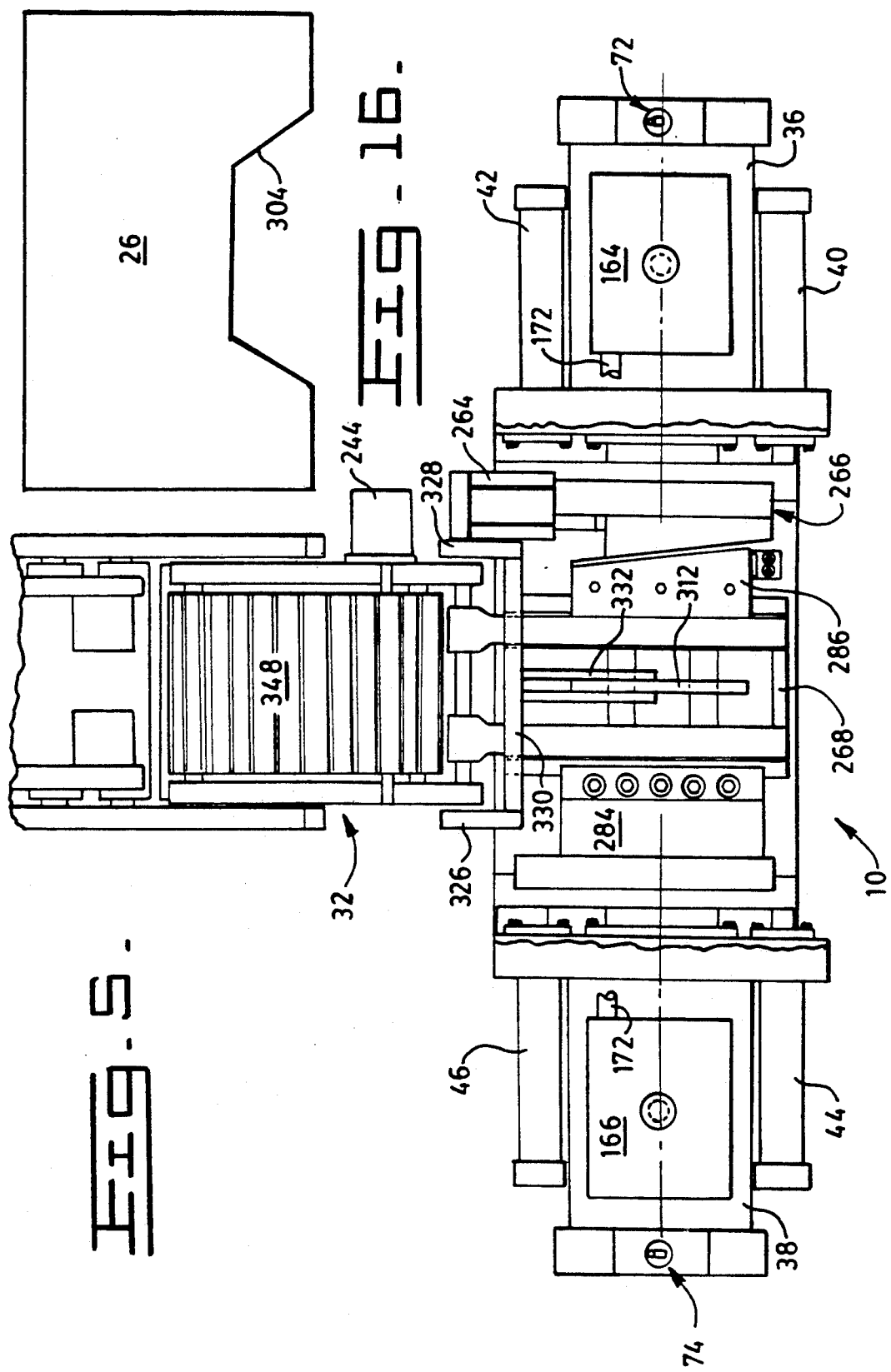

FLUID CONTROL SYSTEM FOR A TRACK PRESS

TECHNICAL FIELD

This invention relates generally to a fluid control system for a track press and more particularly to a plurality of fluid work circuits for performing various work functions. The control system includes first and second fluid work circuits, which are substantially similar, with each fluid circuit including a pair of dual acting slave cylinders and one single acting master cylinder.

BACKGROUND ART

Assembling and dis-assembling the components of endless track chains are often difficult, time consuming, and noisy tasks. The machines used for these tasks are generally quite large, are difficult to operate, and are generally slow in performing the repetitive work functions. Most prior art track press machines utilize a pair of horizontally opposed fluid powered rams for pressing the track chain components together for assembly, or apart, for dis-assembly. Because of the large forces required, the fluid powered rams are generally quite large, and therefore move rather slowly, thereby increasing the time of each work cycle.

One type of track press machine for performing the dis-assembly and re-assembly operations on endless track chains is disclosed in U.S. Pat. No. 3,075,346, issued Jan. 29, 1963, to V. K. Quarve et al. In this patent, a frame and support structure is formed of a plurality of channel shaped beams which are joined together in some manner. Castings are positioned on each end of the support structure and are connected to each other by upper and lower centrally located tie rods. A large diameter cylinder and ram assembly are associated with each end casting, and are supplied with fluid from a fluid reservoir and pump located at one end of the support structure. Because the fluid cylinders are quite large, and are supplied by a single fluid tank located at one end of the machine, the movement of the rams will be rather slow, thereby lengthening the work cycle time.

The present invention is directed to overcoming one or more of the problems as set forth above.

DISCLOSURE OF THE INVENTION

In one aspect of the present invention, a fluid control system for a track press has a source of pressurized fluid, first and second fluid work circuits for receiving the fluid and performing work functions, and first and second control valves for selectively controlling flow of the fluid t the first and second work circuits. Each of the fluid work circuits includes a pair of slave cylinders, a master cylinder, and a high flow capacity control valve, which is in direct communication with a fluid reservoir and with the working chamber of the master cylinder.

Prior art track presses have various undesirable characteristics, including lack of rigidity, large and bulky structures, and slow response and cycle times.

The subject invention provides a fluid control system for a track press which has fast repetitive cycle times.

BRIEF DESCRIPTION OF THE DRAWINGS

FIG. 1 is a diagrammatic side elevational view of a press machine with a chain supporting conveyor shown in a raised position;

FIG. 2 is a diagrammatic side elevational view, similar to FIG. 1, with a chain supporting conveyor shown in a lowered position;

FIG. 3 is a diagrammatic cross-sectional view taken generally along the lines 3—3 of FIG. 2;

FIG. 4 is a diagrammatic front elevational view of a press machine;

FIG. 5 is a diagrammatic plan view of a portion of the press machine shown in FIG. 4;

FIG. 16 is a diagrammatic plan view of the top tensile plate of the subject press machine;

FIG. 17 is a diagrammatic view, partially in section and taken generally along the lines 17—17 of FIG. 1; and FIG. 18 is a diagrammatic plan view, taken generally along the lines 18—18 of FIG. 1.

BEST MODE FOR CARRYING OUT THE INVENTION

Figure 6:
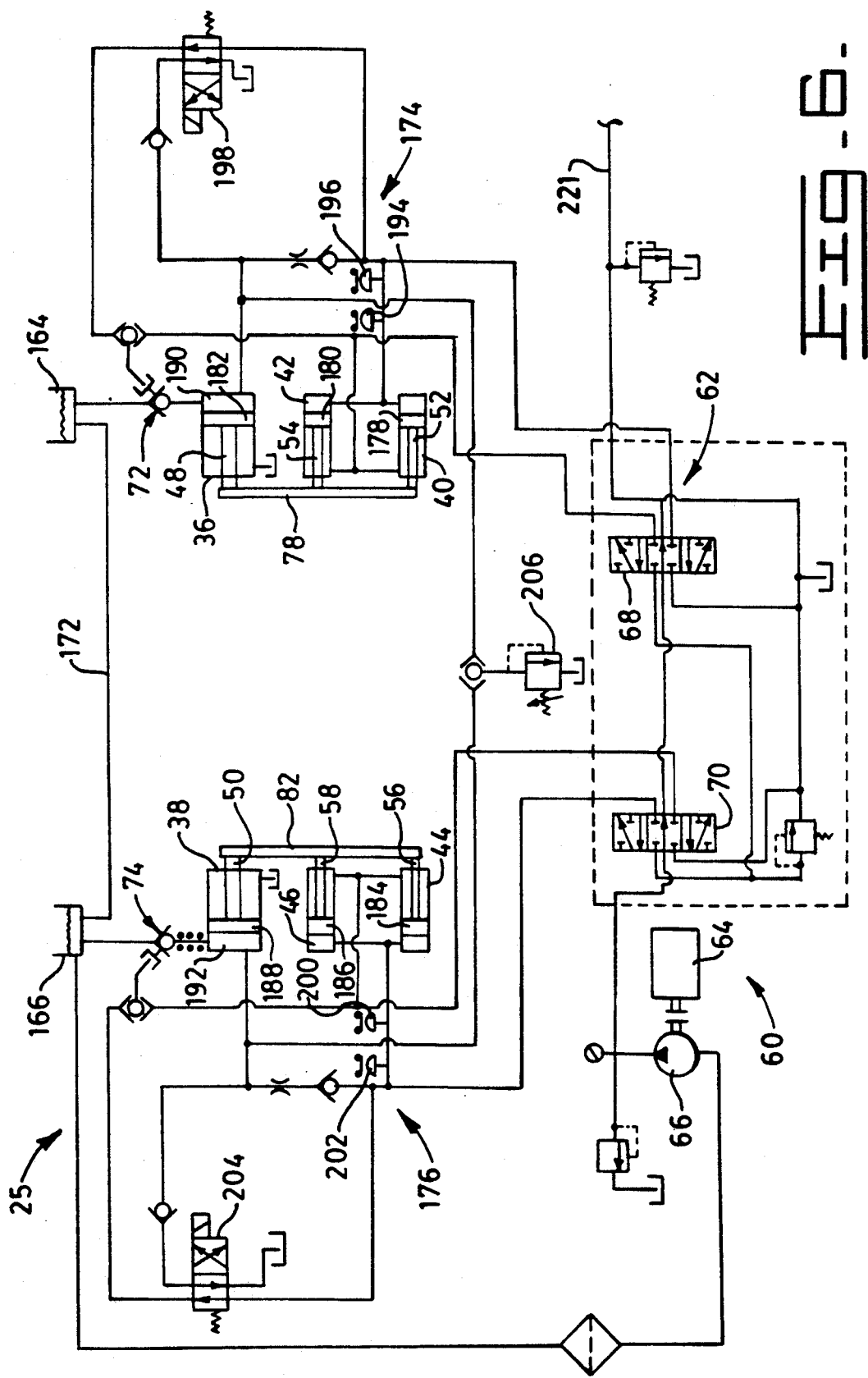
FIG. 6 is a hydraulic schematic of a portion of the fluid control system of a press machine.

Referring to the drawings, a press machine 10 for performing various work operations, such as assembling and dis-assembling the track chain 12 of an endless track assembly 14, has a box beam press frame structure 16 and an elongated track chain supporting and conveying structure 18. The frame structure 16 includes a rigid base plate 20, first and second side wall plates 22, 24, and a rigid top tensile plate 26. The side wall plates 22, 24 are connected to the base plate 20 and the top plate 24 by a plurality of large diameter threaded fasteners 28 to define a rectangularly shaped work area 30. The track chain supporting and conveying structure 18 provides a first means 32 for moving and positioning the track chain 12 toward the work area 30, and has a first end portion 34 positioned adjacent the work area 30.

The press machine 10 further has first and second fluid master cylinders 36, 38 connected to the respective first and second side wall plates 22, 24, first and second fluid slave cylinders 40, 42 connected to the first side wall plate 22, and third and fourth fluid slave cylinders 44, 46 connected to the second side wall plate 24. Each of the master cylinders 36, 38 has a reciprocatable rod 48, 50 which extends through the respective side wall plate 22, 24 and into the work area 30. The first and second slave cylinders 40, 42 are positioned adjacent the first master cylinder 36, and the third and fourth slave cylinders 44, 46 are positioned adjacent the second master cylinder 38. Each of the slave cylinders 40, 42, 44, 46 has a reciprocatable rod 52, 54, 56, 58 which extends through the respective side wall plate 22, 24 and into the work area 30. Preferably, the first and second slave cylinders 40, 42 are positioned on opposite sides of the first master cylinder 36 and the third and fourth slave cylinders 44, 46 are positioned on opposite sides of the second master cylinder 38.

The press machine 10 further includes a second means 60 for providing pressurized fluid to the master cylinders 36, 38 and to the slave cylinders 40, 42, 44, 46, and a third means 62 for selectively controlling the flow of the pressurized fluid to the master and salve cylinders 36, 38, 40, 42, 44, 46. The second means 60 includes an electric motor 64 and a source of pressurized fluid such as a fluid pump 66, which is driven by the motor 64. The third means 62 includes first and second multiple position control valves 68, 70, and first and second pilot operated high flow capacity control valves 72, 74. The second and third means 60, 62, and the master and slave cylinders 36, 38, 40, 42, 44, 46 are part of a fluid control system 25 for the track press 10.

A first tool mounting apparatus 76 includes a first reaction bar 78 which is releasably connected to the rods 48, 52, 54, of the first master cylinder 36 and the first and second slave cylinders 40, 42, and a second tool mounting apparatus 80 includes a second reaction bar 82 which is releasably connected to the rods 50, 56, 58 of the second master cylinder 38 and the third and fourth slave cylinders 44, 46. Each of the reaction bars 78, 82 has front and rear surfaces 84, 86, with the rear surfaces 86 being in contact with the respective rods 48, 50, 52, 54, 56, 58. Each of the tool mounting apparatus 76, 80 includes a bracket assembly 88, a first means 90 for moving the bracket assembly 88 laterally relative to the reaction bar 78, 80, a second means 92 for moving the bracket assembly 88 vertically relative to the reaction bar 78, 80, and a third means 94 for maintaining a preselected downwardly directed force on the bracket assembly 88.

Each of the bracket assemblies 88 includes a tool mounting face plate 96, an adjustment plate 98, and first and second L-shaped brackets 100, 102. The face plate 96 has an elongated T-shaped slot 104 and a rear surface 106 which is matable with the front surface 84 of the reaction bar 78, 82. Each of the L-shaped brackets 100, 102 has a top leg portion 108 and a side leg portion 110, with the top leg portions 108 being connected to the face plate 96 and the side leg portions 110 being matable with the rear surface 86 of the reaction bar 78.

The first means 90 for moving the bracket assembly laterally includes a stud 112, a threaded rod 114 connected to the stud 112, and a threaded adjusting wheel 116 which is threadably engaged with the threaded rod 114. The adjustment plate 98 has first and second slots 118, 120 and an end surface 122, with the stud 112 extending through the first slot 118 and being connected to the reaction bar 78. The adjusting wheel 116 has a first portion 124 engaged with the adjustment plate 98 within the second slot 120, and a second portion 126 engageable with the end surface 122.

The second means 92 for moving the bracket assembly 88 vertically includes first and second threaded holes 128, 130 in a respective top leg portion 108, and first and second threaded shafts 132, 134 which are in engagement with a respective threaded hole 128, 130. The threaded shafts 132, 134 are adapted to thread through the holes 128, 130 and engage the adjustment plate 98. The shafts 132, 134 have a respective manipulating handle 136, 138 for rotating the shafts 132, 134. The second means 92 for moving the bracket assembly 88 vertically, and the third means 94 for maintaining a downwardly directed force on the bracket assembly 88 further includes first and second spring loaded apparatus 140, 142.

Each of the apparatus 140, 142 includes the stud 112 which extends through the adjustment plate 98 and connects to the reaction bar 78. Each stud 112 has an enlarged head portion 144 and a spring 146 encircles the stud 112. In the second spring loaded apparatus 142, the spring 146 is compressed between the enlarged head portion 144 and a washer 148 which covers a portion of the first slot 118 in the adjustment plate 98. In the first spring loaded apparatus 140, the spring 146 is compressed between the enlarged head portion 144 and an eye portion 150 of the threaded rod 114. The threaded rod 114 is connected to the stud 112 through the eye portion 150. A washer 148 is positioned between the eye portion 150 and the adjustment plate 98 and covers a portion of the first slot 118.

The adjustment plate 98 has first and second end portions 152, 154 and the first and second spring load apparatus 140, 142 are positioned adjacent a respective end portion 152, 154. The L-shaped brackets 100, 102 are positioned inwardly of and adjacent a respective spring loaded apparatus 140, 142. The face plate 96 has first and second longitudinally extending slots 156, 158 and first and second replaceable contact plates 160, 162 are positioned in the second slot 158 and cooperate with the first slot 156 to form the T-shaped slot 104. Various types and sizes of track tools 163 can be mounted within the T-shaped slots 104.

With particular reference to FIGS. 4, 5, 6, and 7, the press machine 10 has first and second fluid reservoirs 164, 166 which are supported on the frame structure 16 by a pair of plates 168, 170. The reservoirs 164, 166 are interconnected by a tube 172 and are positioned above and adjacent a respective first and second master cylinder 36, 38. The first and second high flow control valves 72, 74 are connected to a respective master cylinder 36, 38 and are in direct controllable fluid communication with a respective fluid reservoir 164, 166 and with a respective master cylinder 36, 38.

Figure 7:
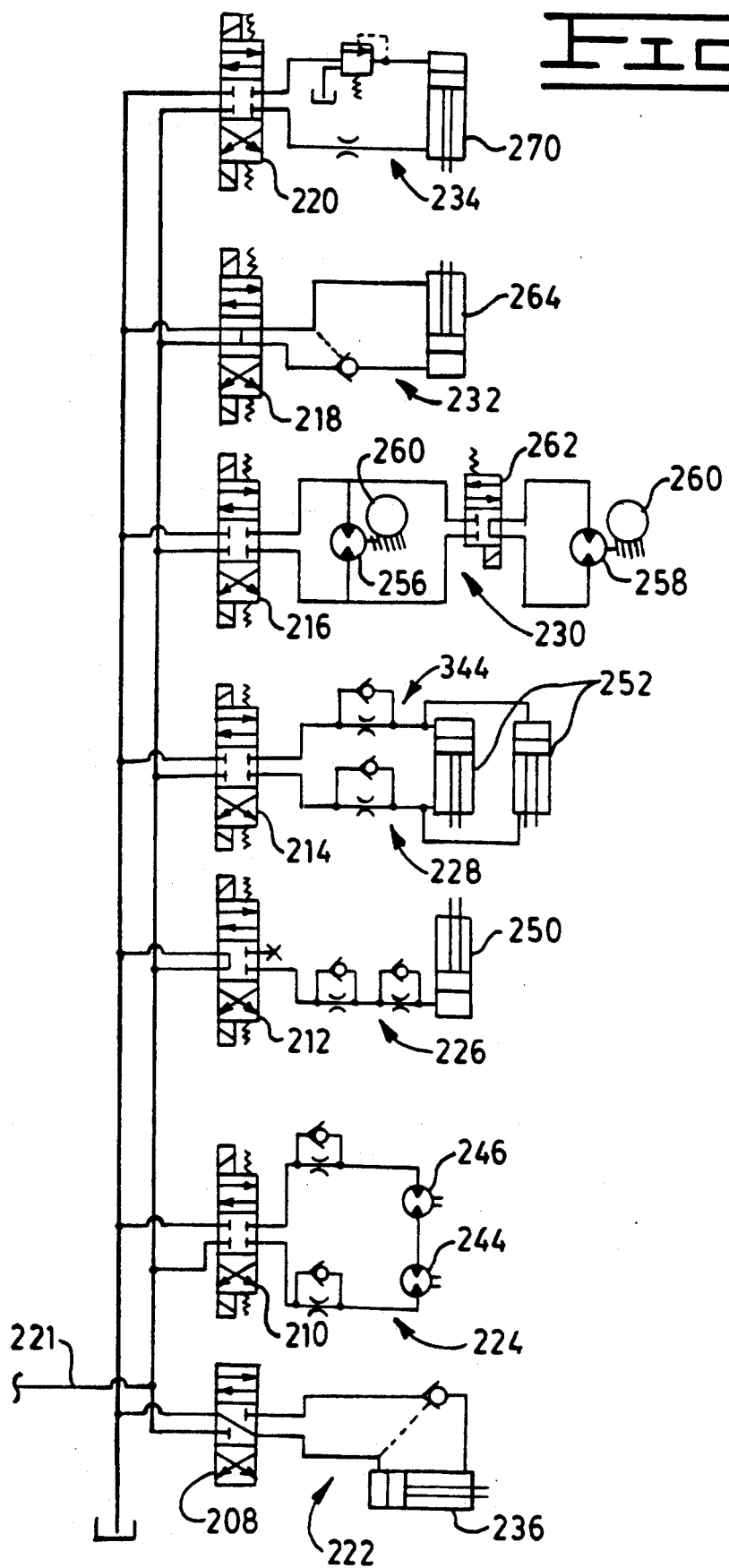
FIG. 7 is a hydraulic schematic of another portion of the fluid control system of a press machine.
Figure 8:
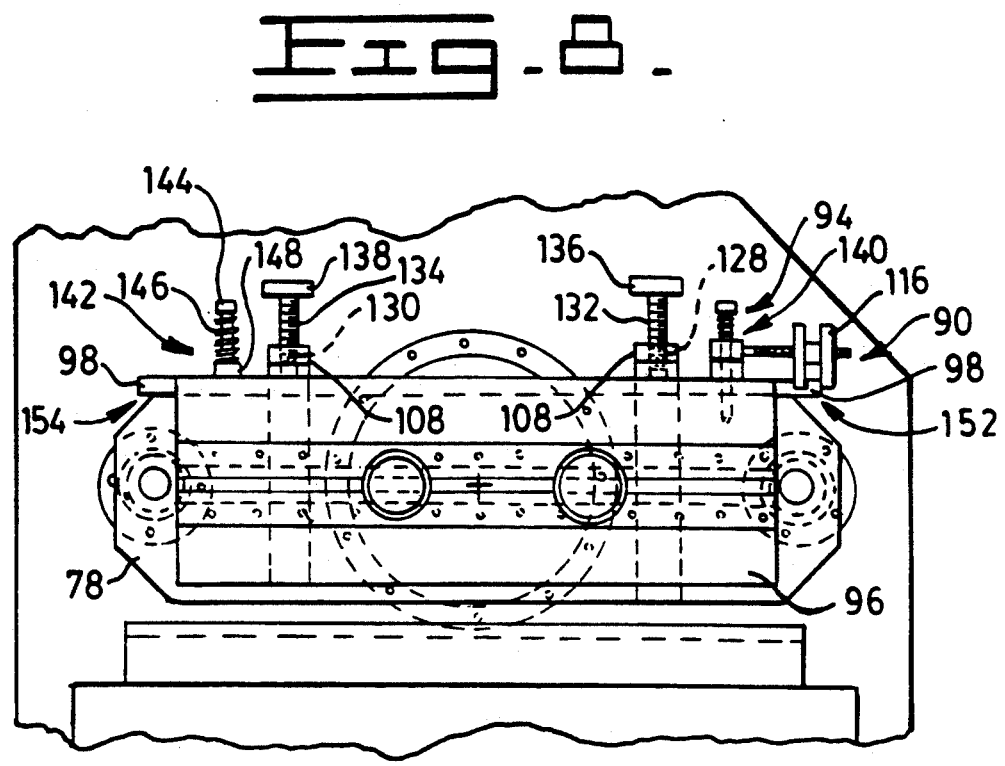
FIG. 8 is a diagrammatic front elevational view, partly in section, of a tool mounting arrangement for a press machine.
Figure 9:
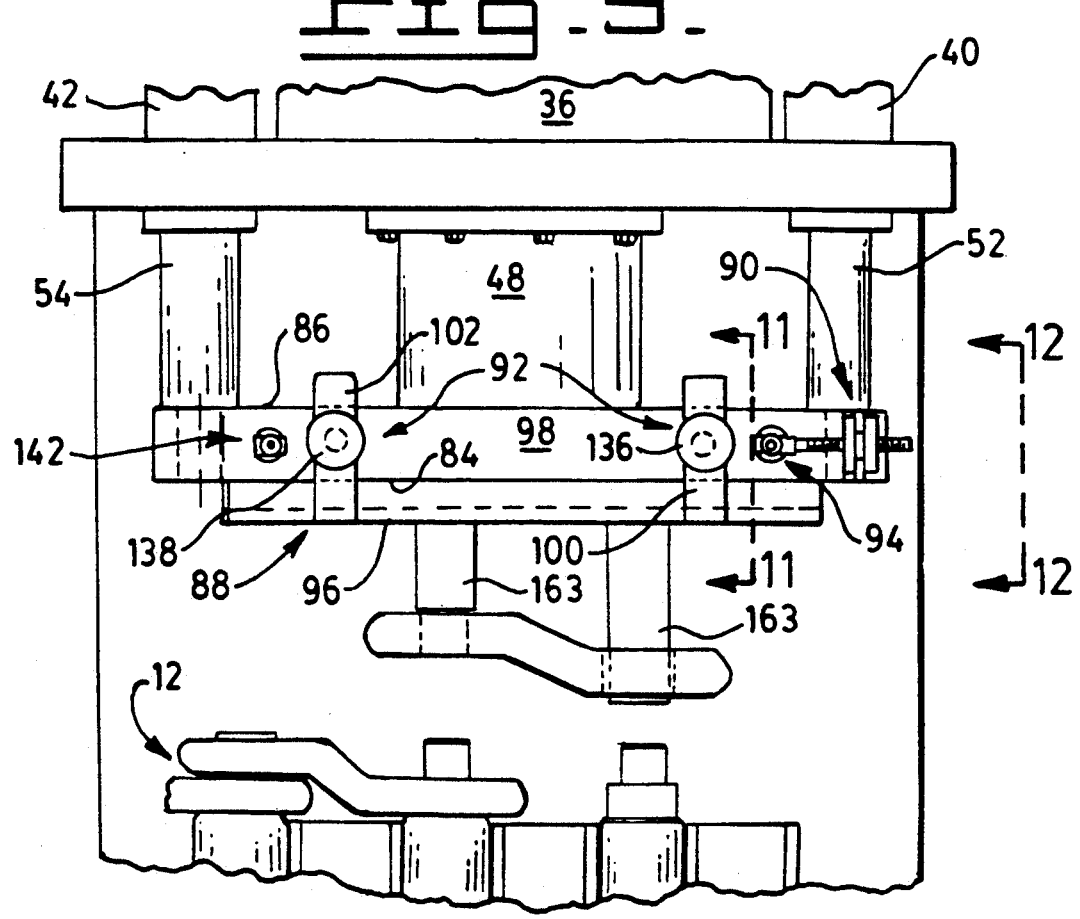
FIG. 9 is a diagrammatic plan view of the tool mounting arrangement shown in FIG. 8.
Figure 10:
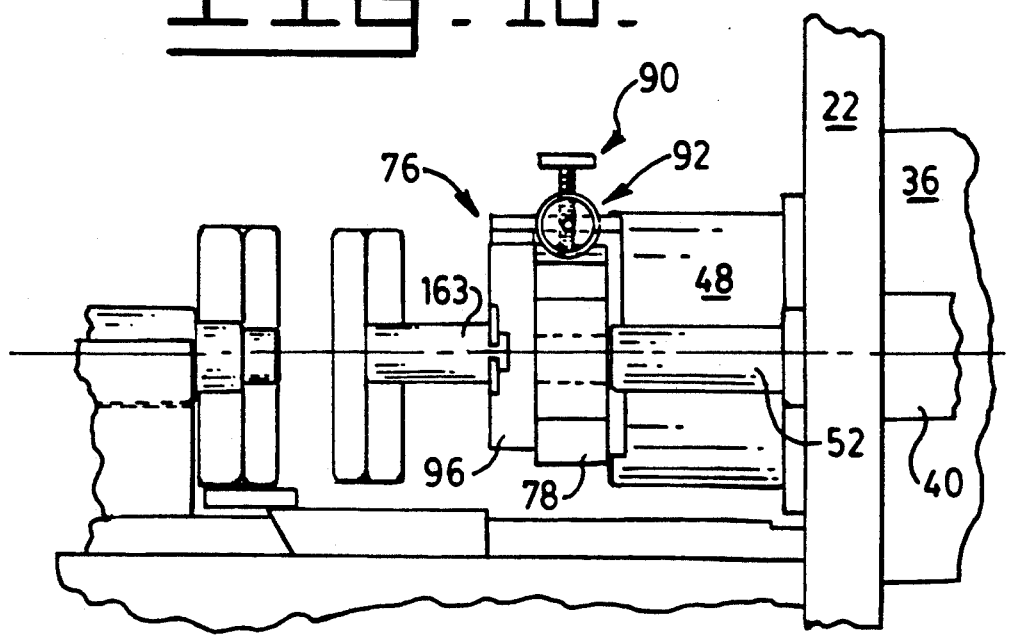
FIG. 10 is a diagrammatic side elevational view of the tool mounting arrangement shown in FIG. 8.
Figure 11:
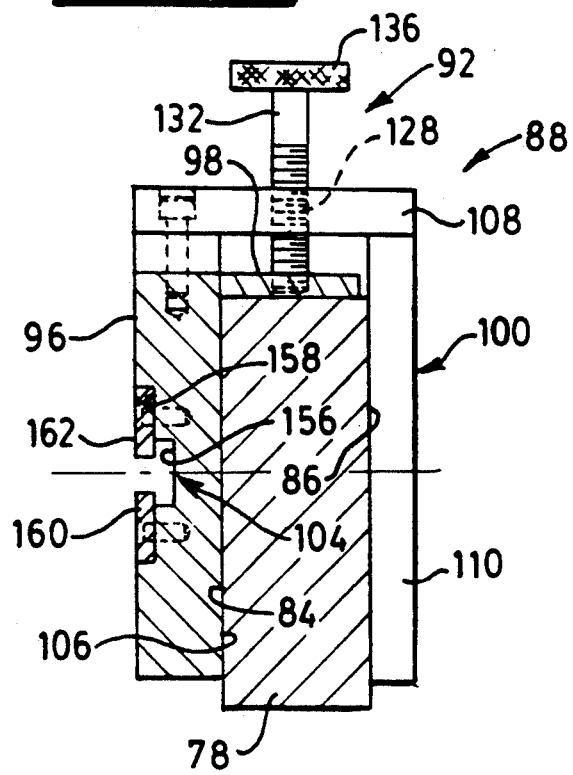
FIG. 11 is a diagrammatic cross-sectional view taken generally along the lines 11—11 of FIG. 9.
Figure 12:
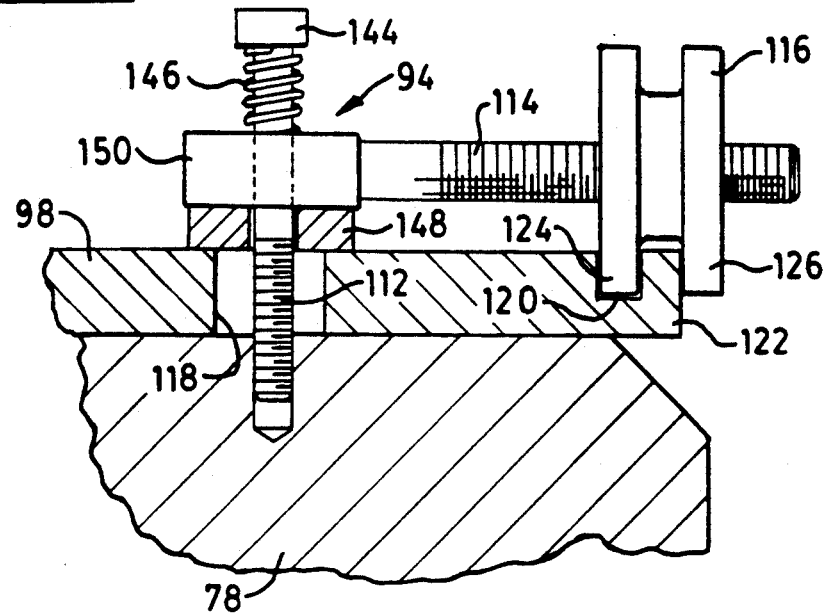
FIG. 12 is a diagrammatic cross-sectional view taken generally along the lines 12—12 of FIG. 9.
Figure 13:
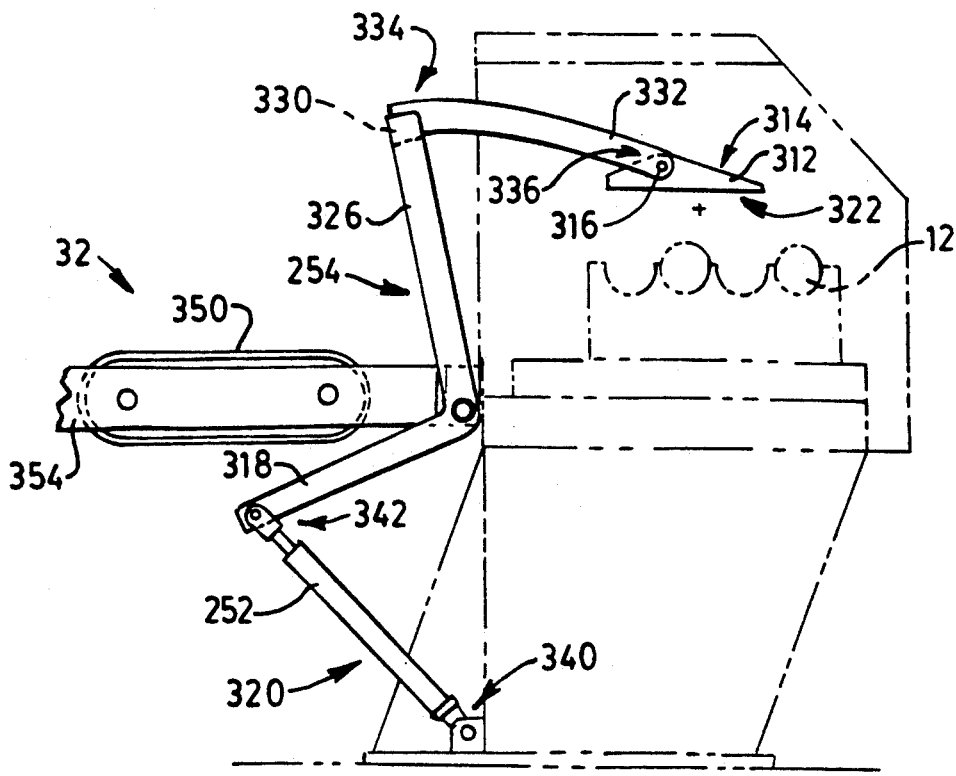
FIG. 13 is a diagrammatic side elevational view of a clamp mechanism of a press machine, with a clamp bar in a raised position.
Figure 14:
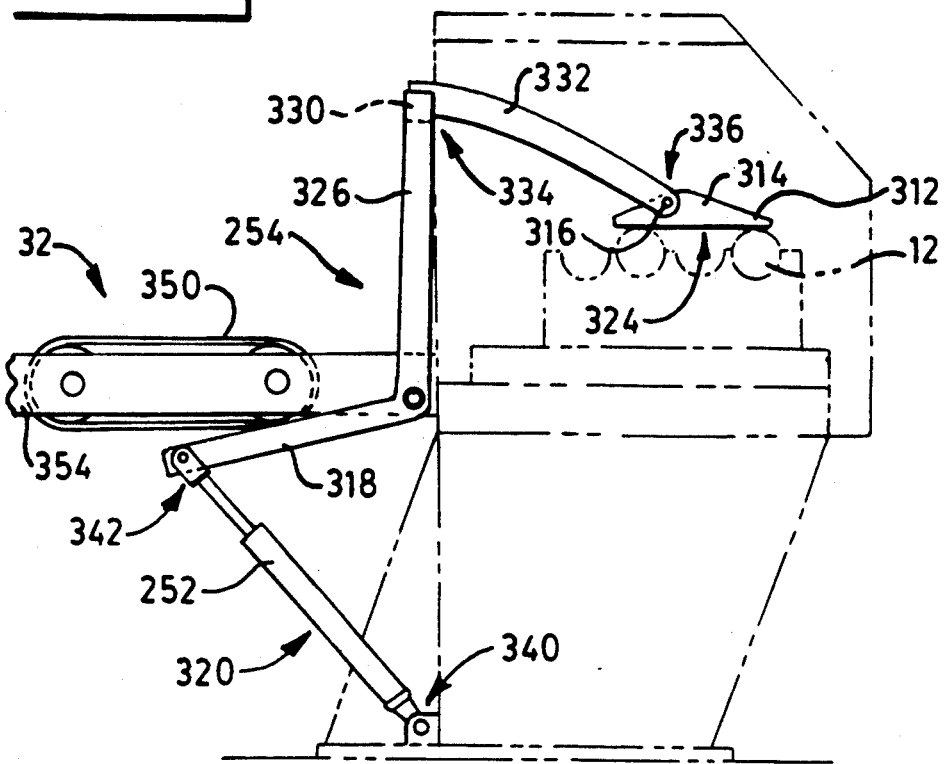
FIG. 14 is a diagrammatic side elevational view, similar to FIG. 13, with a clamp bar in a lowered position.
Figure 15:
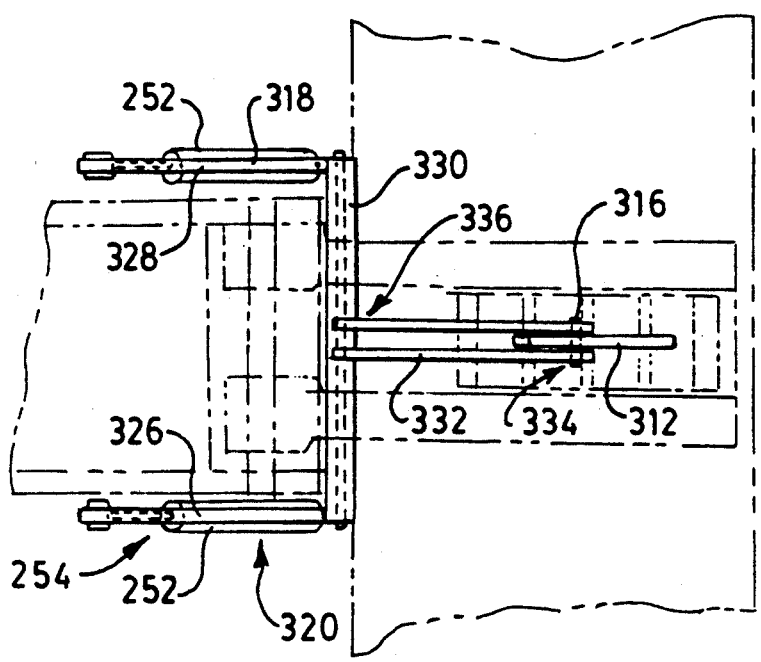
FIG. 15 is a diagrammatic plan view of the clamp mechanism shown in FIG. 14.

With further reference to FIGS. 6 and 7, the fluid control system 25 for the track press 10 includes first and second fluid work circuits 174, 176 for receiving pressurized fluid from the motor 64 and the pump 66 for performing various work functions. The first and second control valves 68, 70 selectively control flow of pressurized fluid to the respective first and second fluid work circuits 174, 176. The first work circuit 174 includes the first and second dual acting slave cylinders 40, 42, and the first single acting master cylinder 36, and the second work circuit 176 includes the third and fourth dual acting slave cylinders 44, 46, and the second single acting master cylinder 38. The first and second slave cylinders 40, 42 have respective pistons 178, 180 and rods 52, 54 and the first master cylinder 36 has a piston 182 and the rod 48. Likewise, the third and fourth slave cylinders 44, 46 have respective pistons 184, 186 and rods 56, 58 and the second master cylinder 38 has a piston 188 and the rod 50. As previously noted, the rods 52, 54 and 48 are connected to the first reaction bar 78, and the rods 56, 58 and 50 are connected to the second reaction bar 82.

The first work circuit 174 further includes the first fluid reservoir 164 and the first high flow capacity control valve 72. The first master cylinder 36 has a working chamber 190 and the first high flow capacity control valve 72 is in direct fluid communication with the first reservoir 164 and the working chamber 190. The second work circuit 176 includes the second fluid reservoir 166 and the second high flow capacity control valve 74. The second master cylinder 38 has a working chamber 192 and the second high flow capacity control valve 74 is in direct fluid communication with the second fluid reservoir 166 and the working chamber 192.

The first fluid work circuit 174 further includes first and second pressure activated limit switches 194, 196 and a first solenoid operated fluid control valve 198. Likewise, the second circuit 176 includes third and fourth pressure activated limit switches 200, 202 and a second solenoid operated fluid control valve 204. An adjustable relief valve 206 controls the maximum fluid pressure in the working chambers 190 and 192 of both master cylinders 36 and 38.

The first control system 25 further includes a third, fourth, fifth, sixth, seventh, eighth, and ninth multiple position control valves 208, 210, 212, 214, 216, 218, 220 and respective third, fourth, sixth, seventh, eighth, and ninth fluid work circuits 222, 224, 226, 228, 230, 232, 234 for receiving the pressurized fluid from the pump 66 and performing various work functions. Fluid is provided to these additional fluid work circuits by a fluid line 221, which also provides fluid to the first and second fluid work circuits 174, 176. The third work circuit 222 includes a dual-acting fluid cylinder 236 which is adapted to perform a work function of moving a conveyor table 238 between first position 240 at which the conveyor table 238 is elevated and a second position 242 at which the conveyor table 238 is lowered. The fourth work circuit 224 includes first and second reversible fluid motors 244, 246 which are adapted to perform a work function of rotating an indexing apparatus 248 in forward and reverse directions. The fifth work circuit 226 includes a single acting fluid cylinder 250 which is adapted to move the indexing apparatus 248 between a first raised position and a second lowered position.

The sixth work circuit 228 includes a pair of dual acting fluid cylinders 252 which are adapted to apply a preselected force to a clamping mechanism 254. The seventh work circuit 230 includes first and second reversible fluid motors 256, 258 which are adapted to rotate a winch apparatus 260 in forward and reverse directions. The seventh fluid work circuit also includes a two-position control valve 262 which is adapted to divide the pressurized fluid between the first and second fluid motors 256, 258. The eighth fluid work circuit 232 includes a double acting fluid cylinder 264 which is adapted to move a first locking mechanism 266 into engagement with a track chain holding fixture 268. The ninth work circuit 234 includes a double-acting fluid cylinder 270 which is part of a means 352 for moving a first belted drive mechanism 348 toward a second belted drive mechanism 350.

With particular reference to FIGS. 4, 5, and 16, the press machine 10 includes the track chain holding fixture 268 which is connectable to the base plate 20, is positioned substantially centrally within the work area 30, and is adapted to receive a portion of the track chain 12. The fixture 268 has first and second taper side walls 276, 278 which are adapted to mate with similar tapered side walls 280 282 of first and second clamping plates 284, 286. The first clamping plate 284 is securely connected to the base plate 20 by a plurality of threaded fasteners 288. The dual-acting fluid cylinder 264 is adapted to move the mating tapered surfaces 276, 280 and 278, 282 together to secure the holding fixture against the base plate 20.

The press machine 10 further includes a support structure 290 positioned below the base plate 20, with the support structure 290 including first and second spaced apart vertical legs 292, 294, a vertical back plate 296, a vertical front plate 298, and a horizontal floor plate 300. The support structure 290 and the base plate 20 define an enclosed power supply area 302, and the motor 64 and fluid pump 66 are positioned in this enclosed area 302. This provides a press machine having a low noise level.

The top tensile plate 26 has a central cut out area 304 which is positioned substantially centrally above the work area 30. This allows the press machine operator more room to manipulate the track chain components and the tools during assembly and dis-assembly operations. A vertically movable door 306 adapted to enclose the work area 30. The door 306 is movable in a vertical direction from a first closed position at which the work area 30 is enclosed and a second open position at which the door is above the work area 30. The door 306 has a high strength transparent viewing portion 30 which allows the machine operator a close and clear view of the machine operations.

With particular reference to FIGS. 5, 13, 14, and 15, the press machine includes the clamp mechanism 254 for holding a portion of a track chain 12 in the holding fixture 268 and applying a compressive force to the track chain portions 12. The clamp mechanism 254 includes a hold-down bar 312 which has a middle portion 314 and a pivot connection 316 in the middle portion 314. The clamp mechanism 254 further includes a pivotable linkage assembly 318 and a means 320 for pivoting the linkage assembly 318 between a first position 322, at which the hold-down bar 312 is spaced from the track chain 12, and a second position 324 at which the hold-down bar 312 is in contact with the track chain 12. The linkage assembly 318 has first and second parallel side arms 326, 328, a cross beam 330, and a bifurcated central arm 332. The arm 332 has a first end portion 334 which is connected to the hold down bar 312 at the pivot connection 316, and a second end portion 336 which is connected to the cross beam 330.

The means 320 for pivoting the linkage assembly 318 includes the pair of fluid cylinders 252, each having a first end portion 340 connected to the frame structure 16 and a second end portion 342 connected to the linkage assembly 318. With the cylinders 252 retracted, the hold down bar 312 is held in the first position 322, spaced from the track chain 12. As the cylinders 252 are extended, the hold down bar 312 is moved to the second position 324 and contacts the track chain 12. The fluid cylinders 252 are adapted to apply a large initial compressive force (F) between the hold down bar 312 and the track chain 12 of a magnitude in the range of 10,000 to 15,000 lbs (44,500 to 67,750N). Following the application of the initial force (F), the fluid cylinders 252 are adapted to maintain a smaller compressive force (f) between the hold down bar 312 and the track chain 12. Preferably, the smaller force (f) is about 0.1 of the larger force (F). The initial large compressive force (F) is applied to the hold down bar by the sixth fluid work circuit 228 and the second smaller compressive force (f) is maintained on the hold down bar by controllable fluid lock means 344 within the circuit 228.

With reference to FIGS. 1, 2, 13, and 14, the means 32 for moving and positioning the track chain 12 includes the indexing apparatus 248 which is adapted to lift a portion of the track chain 12 and move the track chain 12 either toward or away from the work area 30. The indexing apparatus 248 includes first and second endless belted drive mechanisms 348, 350, the first and second fluid motors 244, 246 connected to a respective drive mechanism 348, 350, and means 352 for moving the first belted drive mechanism 348 toward the second belted drive mechanism 350. The indexing apparatus 248 further includes a movable table 354 which is raised and lowered by the fluid cylinder 250 in the fifth fluid work circuit 226. The first belted drive mechanism 348 is supported by an arm assembly 356 which is pivotably attached at 358 to the table 354. The second belted drive mechanism 350 is supported within the table 354 and is positioned substantially directly beneath the first belted drive mechanism 348. The means 352 for moving the first belted drive mechanism 348 toward the second drive mechanism 350 includes a bracket assembly 360 having first and second arms 362, 364 which straddle the arm assembly 356. The arms 362, 364 pivotably attach to the arm assembly 356 at 366, 368. The lower portion 370 of the bracket assembly 360 is positioned beneath the table 354 and the fluid cylinder 270 is connected between the table 354 and the lower portion 370. As the fluid cylinder 270 is activated, the bracket assembly 360 moves downward which brings the arm assembly 356 and the first belted drive mechanism 348 downward also. By raising the table 354 with the fluid cylinder 250, and lowering the arm assembly 356 with the fluid cylinder 270, the first and second belted drive mechanisms will approach each other and clamp a portion of the track chain 12 between them. By driving the fluid motors 244, 246, the track chain 12 is moved forward or backward.

The mean 32 for moving and positioning the track chain further includes the two speed winch apparatus 260, which includes a cable wound rotatable drum 374. The winch apparatus 260 is positioned directly above and in substantial alignment with the chain supporting and conveying structure 18. The winch apparatus 260 is used to pull the track chain 12 up onto the conveyor structure 18 and move it along the conveyor 18.

With particular reference to FIGS. 1, 2, and 3, the chain supporting and conveying structure 18 includes a frame structure 376, first and second parallel elongated fixed rails 378, 380, the elongated conveyor 238 for supporting the track chain 12, and means 384 for moving the conveyor 238 between a first position 240 at which the conveyor 238 is adjacent said rails 378, 380 and a second position 242 at which the conveyor 238 is spaced from the rails 378, 380. The track assembly 14 includes a plurality of track shoes 390 and the rails 378, 380 are adapted to support the track shoes 390 when the conveyor 238 is at the second position 242. The means 384 includes an elongated rail 392 positioned below the conveyor 238, a plurality of pivotable links 394, and the fluid cylinder 236 connected between the frame structure 376 and the rail 392. The links 394 are spaced along the rail 392 and are pivotally connected to the rail and to the frame structure 376. With the conveyor 238 in the first or upper position 240, the entire endless track assembly 14 is supported by the conveyor 238 and the track shoes 390 are slightly above the rails 378, 380. In this position, the links 394 are in an over-center state to hold the conveyor 238 in the first position 240. The track shoes 390 can be released from the track chain 12 and the conveyor 238 lowered to the second or lower position 242 by activating the fluid cylinder 236. As the conveyor 238 moves from the first position 240 to the second position 242, the track shoes 390 remain in place on the rails 378, 380.

Industrial Applicability

With reference to the drawings, the subject press machine 10 is particularly useful for dis-assembling and re-assembling track chains 12 of endless track assemblies 14. With a track assembly 14 initially laid out on a shop floor, the winch apparatus 260 is activated to operate in high speed and the operator guides the winch cable to the end of the chain conveying structure 18 and connects the cable to the track assembly 14. The winch apparatus 260 is then activated by shifting the control valve 216 to rotate the winch 260 in reverse at low speed and the track assembly 14 is pulled onto the conveying structure 18 until the entire track assembly 14 is supported by the conveying structure 18. Some type of power tool (not shown) is then used to remove the bolts which connect the track shoes 390 to the track chain 12. When all of the bolts have been removed, the fluid cylinder 236 is activated by shifting the control valve 208 to lower the conveyor 238 and the track chain 12. The track shoes 390 will remain in place, supported by the rails 378, 380.

The control valve 212 is now shifted to activate the fluid cylinder 250 to raise the movable table 354. The winch apparatus 260 is once again activated to pull the track chain 12 onto the table 354 and into the indexing apparatus 248. The control valve 210 is now shifted to activate the fluid motors 244, 246 which rotate belted drive mechanism 348, 350. At the same time, the fluid cylinder 270 is activated to lower the arm assembly 356, including the first belted drive mechanism 348, which contacts the track chain 12 and moves it into the work area 30. When the track chain 12 is in proper position within the work area 30, the drive mechanisms 348, 350 are stopped and the arm assembly 356 is raised, and the table 354 is lowered to position the track chain into the holding fixture 268. The control valve 214 is now shifted to activate the fluid cylinders 252 and lower the clamp mechanism 254 onto the track chain 12. The cylinders 252 apply a large compressive force (F) to the track chain 12 to ensure positive seating of the track chain 12 in the holding fixture 268. The large force (F) is then released and the cylinders 252 and the lock means 344 maintain a smaller force (f) on the track chain 12 during dis-assembly and re-assembly.

With the track chain 12 positioned in the holding fixture 244, and the proper track tools 163 mounted in the first and second tool mounting apparatus 76, 80, the first or second control valves 68, 70 is shifted to activate either the first or second fluid circuits 174, 176. Since the operation of the first and second fluid circuits 174, 176 are substantially identical with respect to the right or left sides of the track press, only one circuit will be described. Assume the second control valve 70 is shifted downwardly, with respect to FIG. 6, the pressurized fluid from the pump 66 flows to the head end of the third and fourth slave cylinders 44, 46, across the control valve 204, and to the second high flow capacity valve 74, which opens. The fluid rapidly fills the small slave cylinders 44, 46 and rapidly moves the rods 56 and 58 outwardly. Because the rods 56, 58 of the slave cylinders 44, 46 and the rod 50 of the master cylinder 38 are all connected to the reaction bar 82, the rod 50 of the slave cylinder 38 is moved outwardly also. This creates a partial vacuum in the head end of the master cylinder 38 and fluid from the reservoir 166 flows across the valve 74 and into the master cylinder 38. As soon as the fluid pressure builds up to a preset and predetermined value, the limit switch 200 activates the solenoid operated control valve 204 and shifts it leftwardly, as viewed in FIG. 6. This takes the pressure off the high flow capacity valve 74, which closes and blocks fluid communication between the reservoir 166 and the master cylinder 38. Part of the pressurized fluid is then sent to the head end of the master cylinder 38 and because the total flow of fluid is now being divided between the two small slave cylinders 44, 46 and the large master cylinder 38, the forward movement of the reaction bar 82 and attached track tools 163 decreases. This slower forward motion is to make alignment of the tools 163 easier and to prevent damage to the tools 163 or the track chain 12. As soon as the track tools 163 perform their work function, the control valve 70 is shifted upwardly, as viewed in FIG. 6, the pressurized fluid is directed to the rod end of the small slave cylinders 44, 46 and the rods 56, 58, and 50 are rapidly retracted. Because only the small slave cylinders 44, 46 are pressurized during retraction, the retraction cycle is very short. The adjustable relief valve 206 is in fluid communication with the high pressure working cycle of both the first and second fluid circuits 174, 176 and can be adjusted to control the maximum working pressure.

If the track tools 163 do not align with the track chain, the tools 163 can be adjusted by moving the tool mounting apparatus 76, 80 either vertically or horizontally. To move the tools horizontally, the adjusting wheel 116 is turned either in or out on the threaded rod 114. Because of the connection of the wheel 116 with the adjustment plate 98, the plate 98 moves laterally. The tools 163 are carried on the face place 96, which is connected to the adjustment plate 98. To move the tools vertically, the first or second handles 136, 138 are rotated, which moves the bracket assembly 88 up or down, depending upon which way the handles 136, 138 are rotated. The springs 146 on the studs 112 maintain a constant down pressure on the tool mounting apparatus 76, 80, but allow the tool mounting apparatus 76, 80 to move upwardly during dis-assembly of the track chain, if necessary. Because of the wear of track bushing, such upward motion prevents damage to the track tools 163 and holding fixture 268.

Other aspects, objects and advantages of this invention can be obtained from a study of the drawings, the disclosure, and the appended claims.

We claim:

1. A fluid control system for a track press comprising:
   a source of pressurized fluid;
   a first fluid work circuit for receiving said pressurized fluid and performing a first work function;
   a second fluid work circuit for receiving said pressurized fluid and performing a second work function;
   first and second control valves for selectively controlling flow of said pressurized fluid to said respective first and second work circuit;
   said first work circuit including first and second dual acting slave cylinders and a first single acting master cylinder, each master cylinder having a working chamber, each of said slave and master cylinder having a piston and a rod, said rods of said slave and master cylinders being connected to a first reaction bar;
   said second work circuit including third and fourth dual acting slave cylinders and a second single acting master cylinder, each of said slave and master cylinders having a piston and a rod, said rods of said slave and master cylinders being connected to a second reaction bar;
   said first work circuit including a first fluid reservoir, a pilot operated first high flow capacity control valve in direct communication with said first fluid reservoir and with the working chamber of said first master cylinder; and
   said second work circuit including a second fluid reservoir, a pilot operated second high flow capacity control valve in direct communication with said second fluid reservoir and with the working chamber of said second master cylinder.

2. A fluid control system, as set forth in claim 1, including a third multiple position control valve and a third fluid work circuit for receiving said pressurized fluid and for performing a third work function.

3. A fluid control system, as set forth in claim 2, wherein said third fluid work circuit includes a dual-acting fluid cylinder and said third work function includes moving a conveyor table between first and second positions.

4. A fluid control system, as set forth in claim 1, including a fourth multiple position control valve and a fourth fluid work circuit for receiving said pressurized fluid and for performing a fourth work function.

5. A fluid control system, as set forth in claim 4, wherein said fourth fluid work circuit includes first and second reversible fluid motors and said fourth work function includes rotating an indexing apparatus.

6. A fluid control system, as set forth in claim 1, including a fifth multiple position control valve and a fifth fluid work circuit for receiving said pressurized fluid and for performing a fifth work function.

7. A fluid control system, as set forth in claim 6, wherein said fifth fluid work circuit includes a single acting fluid cylinder and said fifth work function includes moving an indexing apparatus between first and second positions.

8. A fluid control system, as set forth in claim 1, including a sixth multiple position control valve and a sixth fluid work circuit for receiving said pressurized fluid and for performing a sixth work function.

9. A fluid control system, as set forth in claim 8, wherein said sixth fluid work circuit includes a dual acting fluid cylinder and said sixth work function includes applying a preselected force to a clamping apparatus.

10. A fluid control system, as set forth in claim 1, including a seventh multiple position control valve and a seventh fluid work circuit for receiving said pressurized fluid and for performing a seventh work function.

11. A fluid control system, as set forth in claim 10, wherein said seventh fluid work circuit includes first and second reversible fluid motors and said seventh work function includes rotating a winch apparatus.

12. A fluid control system, as set forth in claim 11, wherein said seventh fluid work circuit includes a two-position control valve, said valve being adapted to divide said pressurized fluid between said first and second fluid motors.

13. A fluid control system, as set forth in claim 1, including an eighth multiple position control valve and an eighth fluid work circuit for receiving said pressurized fluid and for performing an eighth work function.

14. A fluid control system, as set forth in claim 13, wherein said eighth fluid work circuit includes a double acting fluid cylinder and said eighth work function includes moving a wedge locking mechanism into engagement with a track chain holding fixture.

15. A fluid control system, as set forth in claim 1, including a ninth multiple position control valve and a ninth fluid work circuit for receiving said pressurized fluid and for performing a ninth work function.

16. A fluid control system, as set forth in claim 15, wherein said ninth fluid work circuit includes a double acting fluid cylinder and said ninth work function includes moving a first belted drive mechanism toward a second belted drive mechanism.

* * * * *